(12) United States Patent
Saunamäki (10) Patent No.: US 8,427,101 B2
(45) Date of Patent: Apr. 23, 2013

(54) WIRELESS ENERGY REPEATER

(75) Inventor: Esa Ilmari Saunamäki, Virrat (FI)

(73) Assignee: Nokia Corporation, Espoo (FI)

(*) Notice: Subject to any disclaimer, the term of this patent is extended or adjusted under 35 U.S.C. 154(b) by 583 days.

(21) Appl. No.: 12/620,861

(22) Filed: Nov. 18, 2009

(65) Prior Publication Data
US 2011/0115430 A1    May 19, 2011

(51) Int. Cl.
*H02J 7/00*    (2006.01)

(52) U.S. Cl.
USPC .......................................... 320/108; 320/115

(58) Field of Classification Search .................... 320/108
See application file for complete search history.

(56) References Cited

U.S. PATENT DOCUMENTS

| | | | |
|---|---|---|---|
| 4,278,941 A * | 7/1981 | Freedman | 324/341 |
| 4,662,001 A | 4/1987 | Cruz et al. | |
| 5,157,362 A | 10/1992 | Zelenz | |
| 5,565,756 A | 10/1996 | Urbish et al. | |
| 5,596,567 A | 1/1997 | deMuro et al. | |
| 5,805,067 A | 9/1998 | Bradley et al. | |
| 5,963,012 A | 10/1999 | Garcia et al. | |
| 6,002,237 A | 12/1999 | Gaza | |
| 6,020,783 A | 2/2000 | Coppola | |
| 6,054,927 A | 4/2000 | Brickell | |
| 6,242,888 B1 | 6/2001 | Cerf | |
| 6,501,246 B2 | 12/2002 | You et al. | |
| 6,617,827 B2 | 9/2003 | Knish et al. | |
| 6,792,297 B2 | 9/2004 | Cannon et al. | |
| 6,828,759 B1 | 12/2004 | Xiong et al. | |
| 6,977,479 B2 | 12/2005 | Hsu | |
| 7,180,265 B2 | 2/2007 | Naskali et al. | |
| 7,199,554 B2 | 4/2007 | Kim et al. | |
| 7,202,634 B2 | 4/2007 | Bucur | |
| 7,205,747 B2 | 4/2007 | Wu | |

(Continued)

FOREIGN PATENT DOCUMENTS

| | | |
|---|---|---|
| FR | 2868542 A1 | 10/2005 |
| GB | 2413458 | 10/2005 |

(Continued)

OTHER PUBLICATIONS

International Search Report for International Application No. PCT/IB2010/053958 dated Jan. 14, 2011.

(Continued)

*Primary Examiner* — Arun Williams
(74) *Attorney, Agent, or Firm* — Locke Lord LLP (57) ABSTRACT

Embodiments of the invention are disclosed for generating a first alternating current in a resonant receiving coil at a resonant frequency in a self-resonant circuit tuned to resonate at substantially the same resonant frequency as a resonant transmitting coil in a self-resonant circuit of a wireless charger, the resonant receiving coil operating as a magnetically coupled resonator with the resonant transmitting coil. The separation distance between the two coils may be several times larger than geometric sizes of the coils. The embodiments convert the first alternating current in a power control circuit to a second alternating current at a different frequency than the resonant frequency. The embodiments drive a the power transmitting coil using the second alternating current to inductively couple with a proximately located power receiving coil in a user's device, to provide power to the power receiving coil in the user's device by contact-less electromagnetic induction.

27 Claims, 10 Drawing Sheets

U.S. PATENT DOCUMENTS

| | | |
|---|---|---|
| 2002/0028699 A1 | 3/2002 | Moquin et al. |
| 2002/0089305 A1* | 7/2002 | Park et al. ............... 320/108 |
| 2003/0231001 A1 | 12/2003 | Bruning |
| 2004/0203478 A1 | 10/2004 | Scott |
| 2004/0221183 A1 | 11/2004 | Lu |
| 2005/0001595 A1 | 1/2005 | May et al. |
| 2006/0202665 A1 | 9/2006 | Hsu |
| 2007/0145830 A1 | 6/2007 | Lee et al. |
| 2007/0229279 A1 | 10/2007 | Yamazaki et al. |
| 2007/0279002 A1 | 12/2007 | Partovi |
| 2008/0220831 A1 | 9/2008 | Alameh et al. |
| 2008/0238364 A1 | 10/2008 | Weber et al. |
| 2008/0303479 A1 | 12/2008 | Park et al. |
| 2009/0157145 A1 | 6/2009 | Cauller |
| 2009/0179502 A1 | 7/2009 | Cook et al. |
| 2009/0284082 A1* | 11/2009 | Mohammadian ............ 307/104 |
| 2010/0007307 A1 | 1/2010 | Baarman et al. |
| 2010/0036773 A1 | 2/2010 | Bennett |
| 2010/0190435 A1 | 7/2010 | Cook et al. |
| 2010/0222010 A1 | 9/2010 | Ozaki et al. |

FOREIGN PATENT DOCUMENTS

| | | |
|---|---|---|
| WO | 03105311 A1 | 12/2003 |
| WO | WO2006001557 | 1/2006 |
| WO | WO2008145982 | 12/2008 |
| WO | 2009037380 A1 | 3/2009 |

OTHER PUBLICATIONS

International Search Report mailed Mar. 8, 2011 in International Application No. PCT/FI2010/050877, 5pp.

U.S. Appl. No. 12/498,872, filed Jul. 7, 2009, Esa Ilmari Saunamäki.

U.S. Appl. No. 12/554,468, filed Sep. 4, 2009, Esa Ilmari Saunamäki.

Z. N. Low, et al., "Design and Test of a High-Power High-Efficiency Loosely Coupled Planar Wireless Power Transfer System" IEEE Transactions on Industrial Electronics, vol. 56, No. 5, May 2009.

T.C. Yo, et al., "Compact Circularly Polarized Rectenna with Unbalanced Circular Slots", IEEE transactions on Antennas and Propagation, vol. 56, No. 3, Mar. 2008.

International Search Report dated Jul. 7, 2009 for International Application No. PCT/FI2010/050431.

\* cited by examiner

WIRELESS ENERGY REPEATER

FIELD

The technical field relates to wireless charging of batteries in portable devices. More particularly, the technical field relates to techniques to link together different types of wireless charging systems.

BACKGROUND

Rechargeable batteries in cellular phones and other portable communication devices, such as NiCd, nickel-metal hydride (NiMH), Lithium-ion, and Lithium-Polymer batteries and Super Capacitors, can be recharged with household alternating current (AC) power coupled through a voltage reduction transformer, an alternating-to-direct current converter, and appropriate battery monitoring and charging circuits. They can also be recharged with a 12-volt cigarette lighter socket provided in an automobile coupled through a DC voltage reduction circuit and appropriate battery monitoring and charging circuits. However, in both cases, the portable communication device must be plugged into the household AC power source or into the automobile power source, limiting the mobility of the communication device.

Recently, wireless charging has become available for rechargeable batteries in cellular phones and other portable communication devices, using contact-less electromagnetic induction. A power source circuit in a wireless charging device drives a resonant frequency circuit that produces a source alternating current in a frequency range for example between 50 kHz and 20 MHz, which is driven through a transmitting coil in the charging device. The alternating magnetic field produced by the transmitting coil inductively couples with a corresponding receiving coil in the cellular phone or other portable communication device, thereby producing a corresponding induced alternating current that drives a circuit at its resonant frequency in the range for example between 50 kHz and 20 MHz to produce an output AC voltage. A conversion circuit in the cellular phone or other portable communication device, uses a transformer to adjust the output AC voltage, an alternating-to-direct current converter, and appropriate battery monitoring and charging circuits to produce an appropriate DC charging voltage for the rechargeable battery.

Large sized wireless charging pads have become available to charge rechargeable batteries in multiple portable communication devices, high powered hand tools, domestic appliances, or garden tools using contact-less electromagnetic induction. Wireless charging pads are generally shaped as a flat plate and typically have an active charging surface approximately the size of a sheet of typing paper. Other shapes for the charging pad may not be flat, but instead shaped to conform to particularly shaped user devices to be charged, for example a charger shaped as a wall-mounted holder for a garden tool. Wireless charging pads use multiple transmitting coils or a single large transmitting coil to distribute their magnetic flux over the active charging surface.

SUMMARY

Example embodiments of the invention are disclosed for generating a first alternating current in a resonant receiving coil at a resonant frequency in a self-resonant circuit tuned to resonate at substantially the same resonant frequency as a resonant transmitting coil in a self-resonant circuit of a wireless charger, the resonant receiving coil operating as a magnetically coupled resonator with the resonant transmitting coil. The separation distance between the two coils may be several times larger than the geometric sizes of the coils. The embodiments convert the first alternating current in a power control circuit to a second alternating current at a different frequency than the resonant frequency. The embodiments drive the power transmitting coil using the second alternating current to inductively couple with a proximately located power receiving coil in a user's device, to provide power to the power receiving coil in the user's device by contact-less electromagnetic induction.

Example embodiments of the invention include a method for generating a first alternating current in a resonant receiving coil at a resonant frequency in a self-resonant circuit tuned to resonate at substantially the same resonant frequency as a resonant transmitting coil in a self-resonant circuit of a wireless charger, the resonant receiving coil operating as a magnetically coupled resonator with the resonant transmitting coil. The method continues by converting the first alternating current in a power control circuit to a second alternating current at a different frequency than the resonant frequency. The method continues by driving a the power transmitting coil using the second alternating current to inductively couple with a proximately located power receiving coil in a user's device.

In example embodiments of the invention, the method further includes resonantly coupling the resonant receiving coil to the resonant transmitting coil when the resonant transmitting coil is driven at the resonant frequency common to both coils, even when a separation distance between the two coils is several times larger than geometric sizes of the coils.

In example embodiments of the invention, the method further includes driving the resonant receiving coil at the resonant frequency and producing a first alternating current at substantially the resonant frequency. The method includes converting the first alternating current to a second alternating current at a different frequency than the resonant frequency. The method includes inductively coupling the power transmitting coil with the proximately located power receiving coil in the user's device using the second alternating current.

In example embodiments of the invention, the method further includes the power transmitting coil being driven at a frequency that ranges between 50 kHz and 20 MHz.

In example embodiments of the invention, the method further includes the resonant frequency ranging between 1 MHz and 30 MHz.

In example embodiments of the invention, a wireless energy repeater receives power from a wireless charger and transfers the power to a wirelessly charged device. The transmitting coil in the charger may be part of a resonant circuit, the receiving coil in the repeater may be part of a resonant circuit, and each resonant circuit may be tuned to resonate at the same frequency so as to operate as magnetically coupled resonators. The wireless energy repeater includes a rechargeable battery that may be recharged from power delivered from the resonant receiving coil. In example embodiments of the invention, the wireless energy repeater may provide power to the rechargeable battery when power is not being delivered from the resonant receiving coil to the power transmitting coil. In alternate embodiments, power may be provided to the rechargeable battery while power is also being delivered from the resonant receiving coil to the power transmitting coil. In other embodiments, the rechargeable battery in the apparatus may provide auxiliary power to the power transmitting coil when insufficient power is being delivered from the resonant receiving coil to the power transmitting coil.

In example embodiments of the invention, when insufficient power is being delivered from the resonant receiving coil to the power transmitting coil, and the rechargeable battery in the wireless energy repeater provides auxiliary power to the power transmitting coil, the wireless energy repeater may automatically reduce the output power of the power transmission coil, for example by reducing the power step by step and simultaneously indicating to the user that power is being reduced, by means of a light or sound signal. If the wireless energy repeater does not receive sufficient energy from the wireless charger, the wireless energy repeater may emit an alarm in the form of a light or sound signal to the user, to indicate that the wireless energy repeater is out of range of the wireless charger for efficient operation or that the wireless charger is switched off.

In example embodiments of the invention, the method further includes wirelessly providing power to the power receiving coil when the power transmitting coil is positioned in close proximity to the power receiving coil in the user's device for contact-less electromagnetic induction.

In example embodiments of the invention, the method further includes wirelessly charging with the power transmitting coil of rechargeable batteries in multiple portable communication devices, high powered hand tools, domestic appliances, or garden tools.

In example embodiments of the invention, the method further includes the resonant receiving coil being geometrically larger than the power transmitting coil.

In example embodiments of the invention, the method further includes a separation distance between the resonant receiving coil and the resonant transmitting coil being larger than a separation distance between the power transmitting coil and the power receiving coil.

Example embodiments of the invention include an apparatus including a resonant receiving coil in a self-resonant circuit tuned to resonate at substantially a same resonant frequency as a resonant transmitting coil in a self-resonant circuit of a wireless charger, the resonant receiving coil operating as a magnetically coupled resonator with the resonant transmitting coil. The apparatus includes a power transmitting coil configured to inductively couple with a proximately located power receiving coil in a user's device, to wirelessly provide power to the power receiving coil. The apparatus includes a power control circuit coupled between the resonant receiving coil and the power transmitting coil, having a control input configured to control power delivered from the resonant receiving coil to the power transmitting coil.

In example embodiments the apparatus further includes the resonant receiving coil being resonantly coupled to the resonant transmitting coil when the resonant transmitting coil is driven at the resonant frequency common to both coils, even when a separation distance between the two coils is several times larger than geometric sizes of the coils.

In example embodiments the apparatus further includes the resonant receiving coil being driven at the resonant frequency and producing a first alternating current at substantially the resonant frequency. The power control circuit may be configured to convert the first alternating current to a second alternating current at a different frequency than the resonant frequency. The power transmitting coil may be configured to inductively couple with the proximately located power receiving coil in the user's device using the second alternating current to provide power to the power receiving coil in the user's device by contact-less electromagnetic induction.

DISCUSSION OF EXAMPLE EMBODIMENTS
OF THE INVENTION

Figure 1:
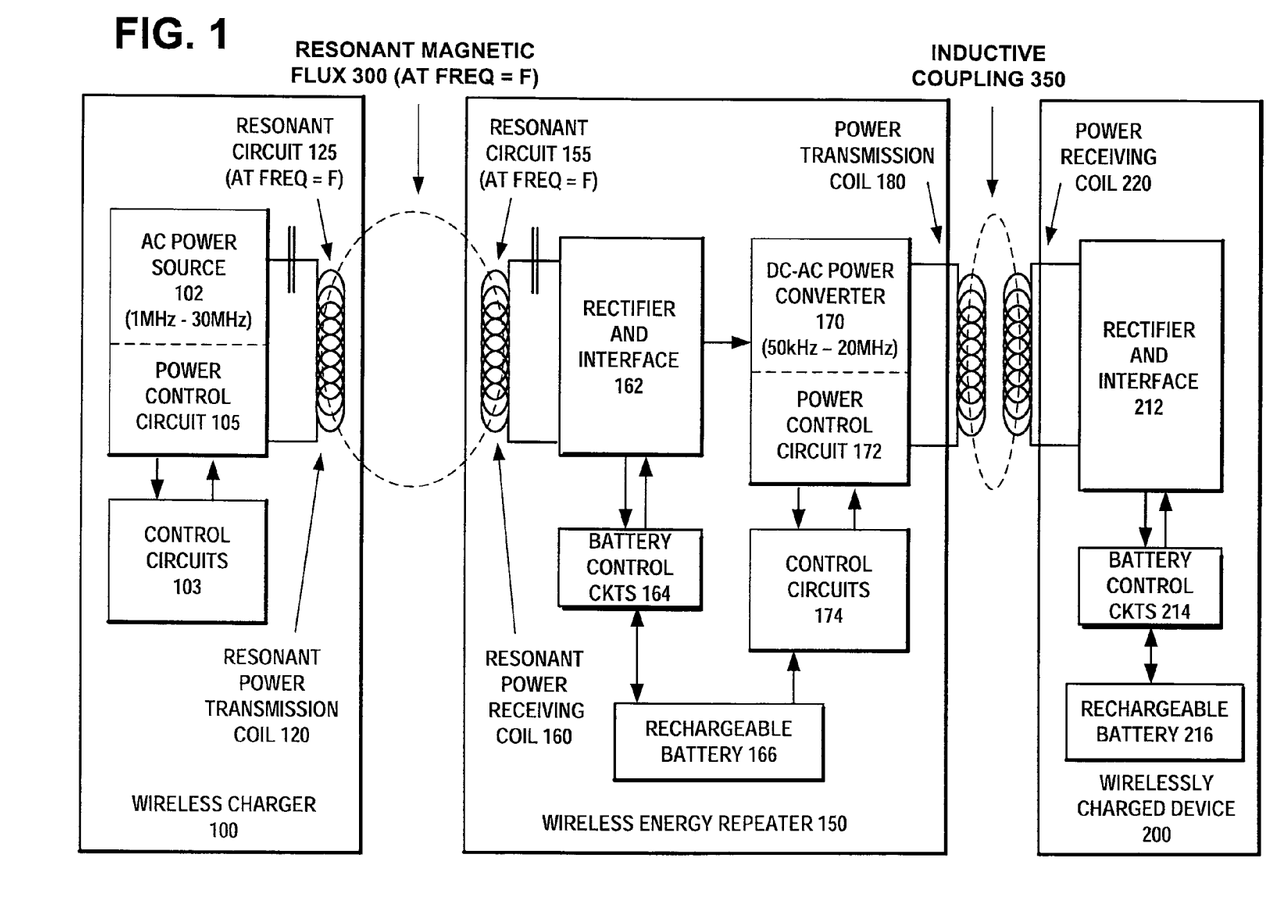
FIG. 1 illustrates an example embodiment for an arrangement of a wireless charger 100, a wireless energy repeater 150, and a wirelessly charged device 200, wherein the transmitting coil in the charger may be part of a resonant circuit and the receiving coil in the repeater may be part of a resonant circuit and each resonant circuit may be tuned to resonate at the same frequency "F" so as to operate as magnetically coupled resonators.

FIG. 1 illustrates an example embodiment for an arrangement of a wireless charger 100, a wireless energy repeater 150, and a wirelessly charged device 200, wherein the transmitting coil in the charger may be part of a resonant circuit and the receiving coil in the repeater may be part of a resonant circuit and each resonant circuit may be tuned to resonate at the same frequency "F" so as to operate as magnetically coupled resonators.

The transmitting coil 120 in the charger 100 may be part of a self-resonant circuit 125 and the receiving coil 160 in the wireless energy repeater 150 may be part of a self-resonant circuit 155. The resonant circuit 125 is self-resonant at the frequency "F" and the resonant circuit 155 is self-resonant at the frequency "F". Each resonant circuit 125 and 155 is tuned to resonate at the same frequency "F" so that they operate as magnetically coupled resonators. The transmitting coil 120 and the receiving coil 160 are resonantly coupled by the resonant magnetic flux 300 oscillating at the frequency "F" when the power source circuit 102 in the charging device 100 drives the transmitting coil 120 at the resonant frequency "F" common to both coils 120 and 160. The resonant magnetic coupling is strong even when the distance between the two coils is several times larger than the geometric sizes of the coils. The resonant frequency "F" can be in the MHz range, for example from 1 MHz to over 30 MHz. This enables efficient power transfer from the wireless charger 100 to the wireless energy repeater 150.

A power control circuit 105 is coupled between the power source 102 and the transmitting coil 120, having a control input configured to control power delivered from the power source 102 to the transmitting coil 120. The controlled power can be a simple binary on/off control or it may be a graduated step-wise control, or it may be a continuous control between a minimum and maximum output power. Control circuits 103 monitor the output from the AC mains or DC battery and control the level of power output by the power source 102 through the power control circuit 105 to the power transmitting coil 120.

In an example embodiment, the power source circuit 102 in the wireless charging device 100 drives the power control circuit 105, which produces a source alternating current in a frequency range, for example, between 1 MHz to over 30 MHz, which will provide energy to recharge the rechargeable batteries 216 in the user's charged device 200.

In the example embodiments, the source alternating current in the wireless charging device 100 may be passed through an optional radio frequency blocking filter to limit the radio frequency noise that would otherwise reach the communication circuits and RF antenna of the user's communication device 200. The optional radio frequency blocking filter in the wireless charging device 100 and a radio frequency blocking filter in the user's charged device 200 are described in greater detail in the copending US patent application entitled "Wireless Charging Coil Filtering" by Esa Ilmari Saunamäki, application Ser. No. 12/498,872, filed Jul. 7, 2009, which is incorporated herein by reference.

The wireless energy repeater 150 includes a power transmitting coil 180 configured to inductively couple with a proximately located power receiving coil 220 in the user's device 200, to wirelessly provide power to the power receiving coil 220. The wireless energy repeater 150 includes a power control circuit 172 coupled between the resonant receiving coil 160 and the power transmitting coil 180, having a control input configured to control power delivered from the resonant receiving coil 160 to the power transmitting coil 180. The wireless energy repeater 150 further includes the resonant receiving coil 160 being resonantly coupled to the resonant transmitting coil 120 when the resonant transmitting coil 120 is driven at the resonant frequency common to both coils, even when a separation distance between the two coils is several times larger than geometric sizes of the coils 120 and 160.

The wireless energy repeater 150 further includes the resonant receiving coil 160 being driven at the resonant frequency and producing a first alternating current at substantially the resonant frequency. The power control circuit 172 may be configured to convert the first alternating current to a second alternating current at a different frequency than the resonant frequency. The second alternating current will typically be a lower frequency than the resonant frequency, but in some embodiments, the second alternating current may be a higher frequency than the resonant frequency. The power transmitting coil 180 may be configured to inductively couple with the proximately located power receiving coil 220 in the user's device 200 using the second alternating current to provide power to the power receiving coil 220 in the user's device 200 by contact-less electromagnetic induction. The power transmitting coil 180 may be driven at a frequency that ranges between 50 kHz and 20 MHz.

The wireless energy repeater 150 further includes recharging a rechargeable battery 166 from power delivered from the resonant receiving coil 160. The wireless energy repeater 150 includes providing power to the rechargeable battery 166 when power is not being delivered from the resonant receiving coil 160 to the power transmitting coil 180. Alternately, the wireless energy repeater 150 includes providing power to the rechargeable battery 166 while power is also being delivered from the resonant receiving coil 160 to the power transmitting coil 180.

The wireless energy repeater 150 further includes wirelessly providing power to the power receiving coil 220 when the power transmitting coil 180 is positioned in close proximity to the power receiving coil 220 in the user's device 200 for contact-less electromagnetic induction.

The wireless energy repeater 150 includes wirelessly charging with the power transmitting coil 180 of rechargeable batteries in multiple portable communication devices, high powered hand tools, domestic appliances, or garden tools.

The wireless energy repeater 150 resonant receiving coil 160 is geometrically larger than the power transmitting coil 180.

The wireless energy repeater 150 includes a separation distance between the resonant receiving coil 160 and the resonant transmitting coil 120 being larger than the separation distance between the power transmitting coil 180 and the power receiving coil 220.

Figure 2:
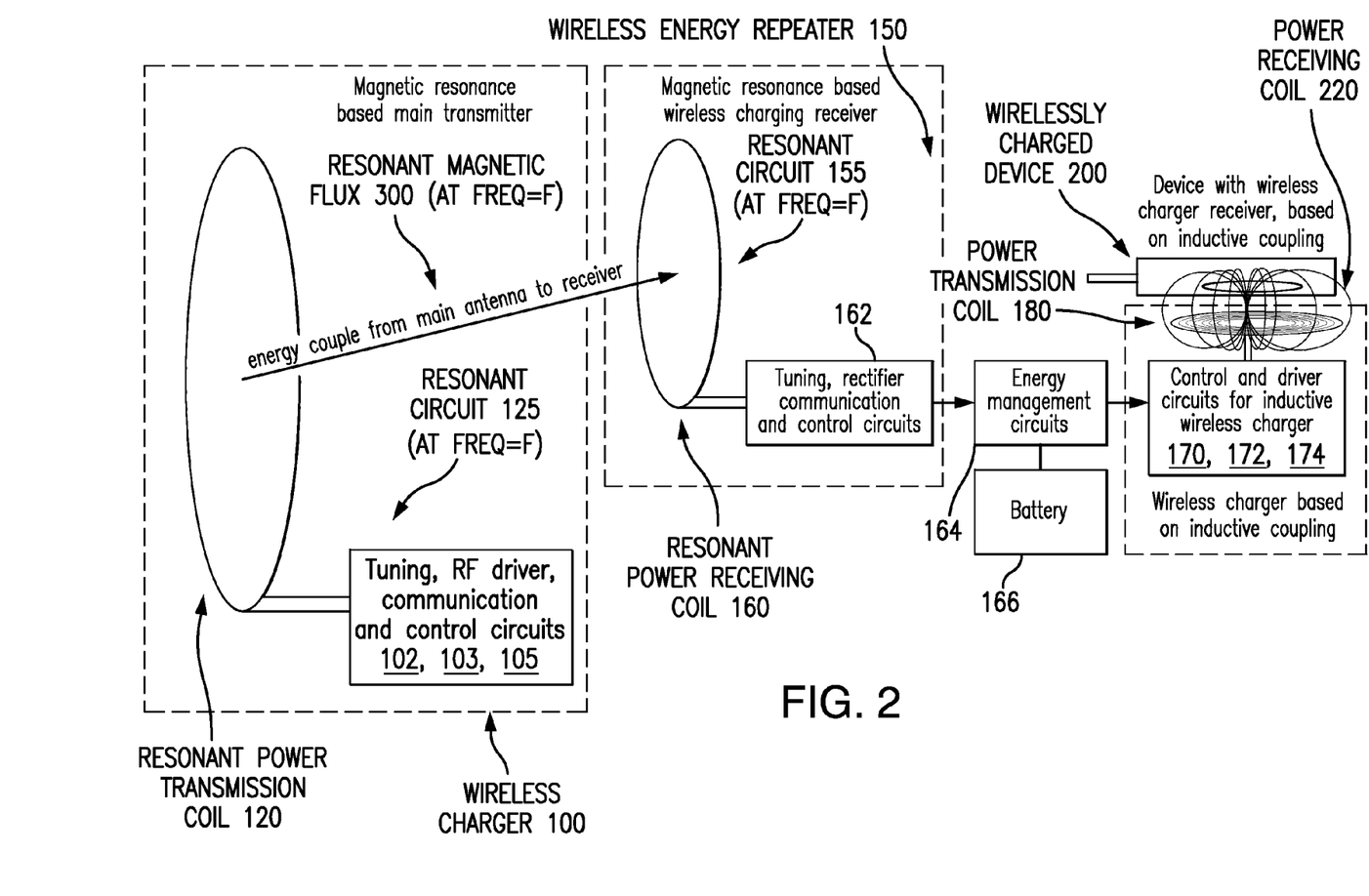
FIG. 2 is a more detailed illustration of the wireless charger 100, wireless energy repeater 150, and wirelessly charged device 200 of FIG. 1, showing an example arrangement of the resonant power transmission coil 120 of the charger 100 and the resonant power receiving coil 160 of the repeater 150 as magnetically coupled resonators.

FIG. 2 is a more detailed illustration of the wireless charger 100, wireless energy repeater 150, and wirelessly charged device 200 of FIG. 1, showing an example arrangement of the resonant power transmission coil 120 of the charger 100 and the resonant power receiving coil 160 of the repeater 150 as magnetically coupled resonators. The wireless energy repeater 150 resonant receiving coil 160 is geometrically larger than the power transmitting coil 180. The wireless energy repeater 150 includes a separation distance between the resonant receiving coil 160 and the resonant transmitting coil 120 being larger than the separation distance between the power transmitting coil 180 and the power receiving coil 220.

Figure 3:
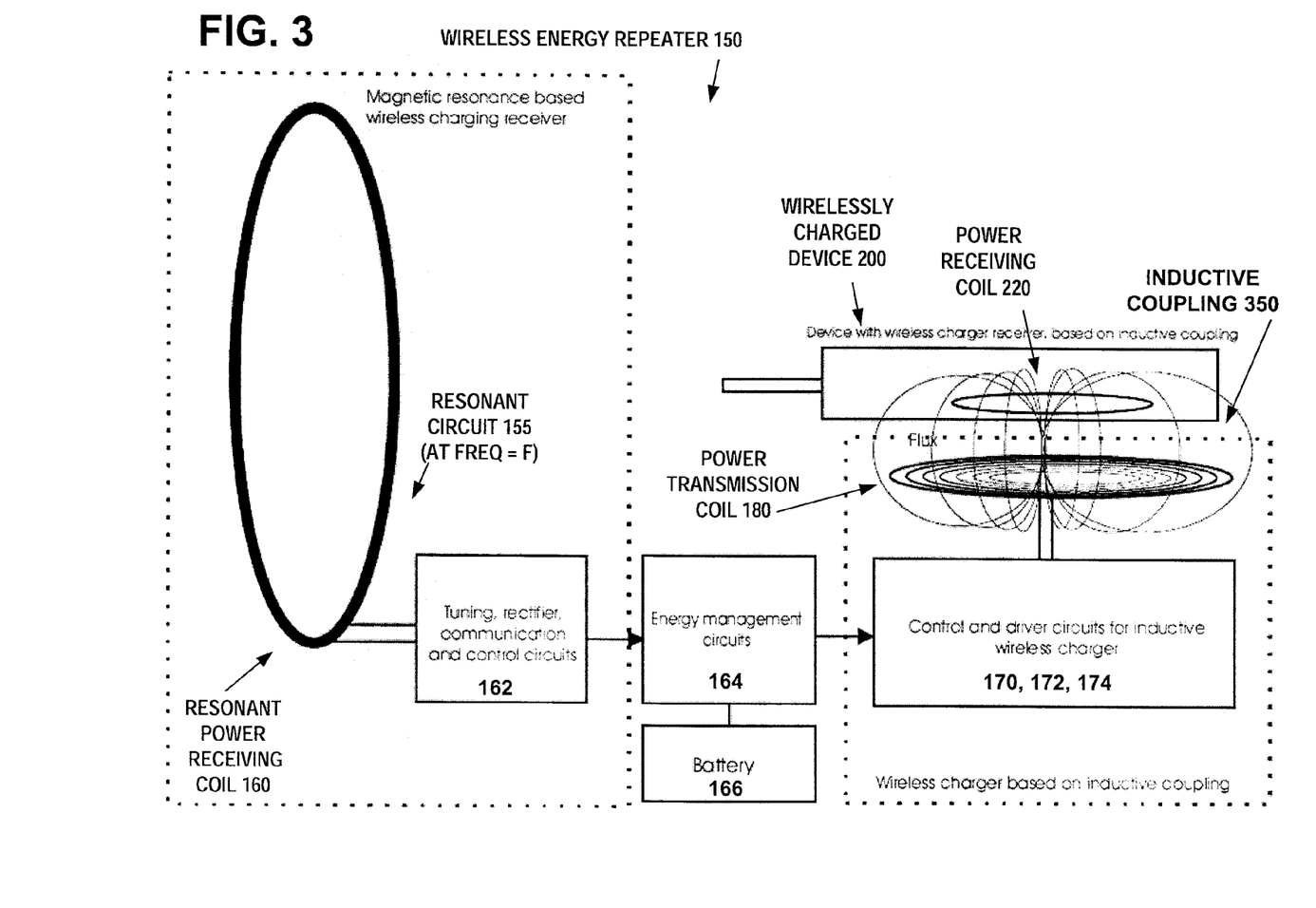
FIG. 3 is a more detailed illustration of the wireless energy repeater 150 and wirelessly charged device 200 of FIG. 1, showing an example arrangement of the power transmission coil 180 of the repeater 150, inductively coupled at 350 with the power receiving coil 220 of the wirelessly charged device 200.

FIG. 3 is a more detailed illustration of the wireless energy repeater 150 and wirelessly charged device 200 of FIG. 1, showing an example arrangement of the power transmission coil 180 of the repeater 150, inductively coupled at 350 with the power receiving coil 220 of the wirelessly charged device 200.

Figure 4:
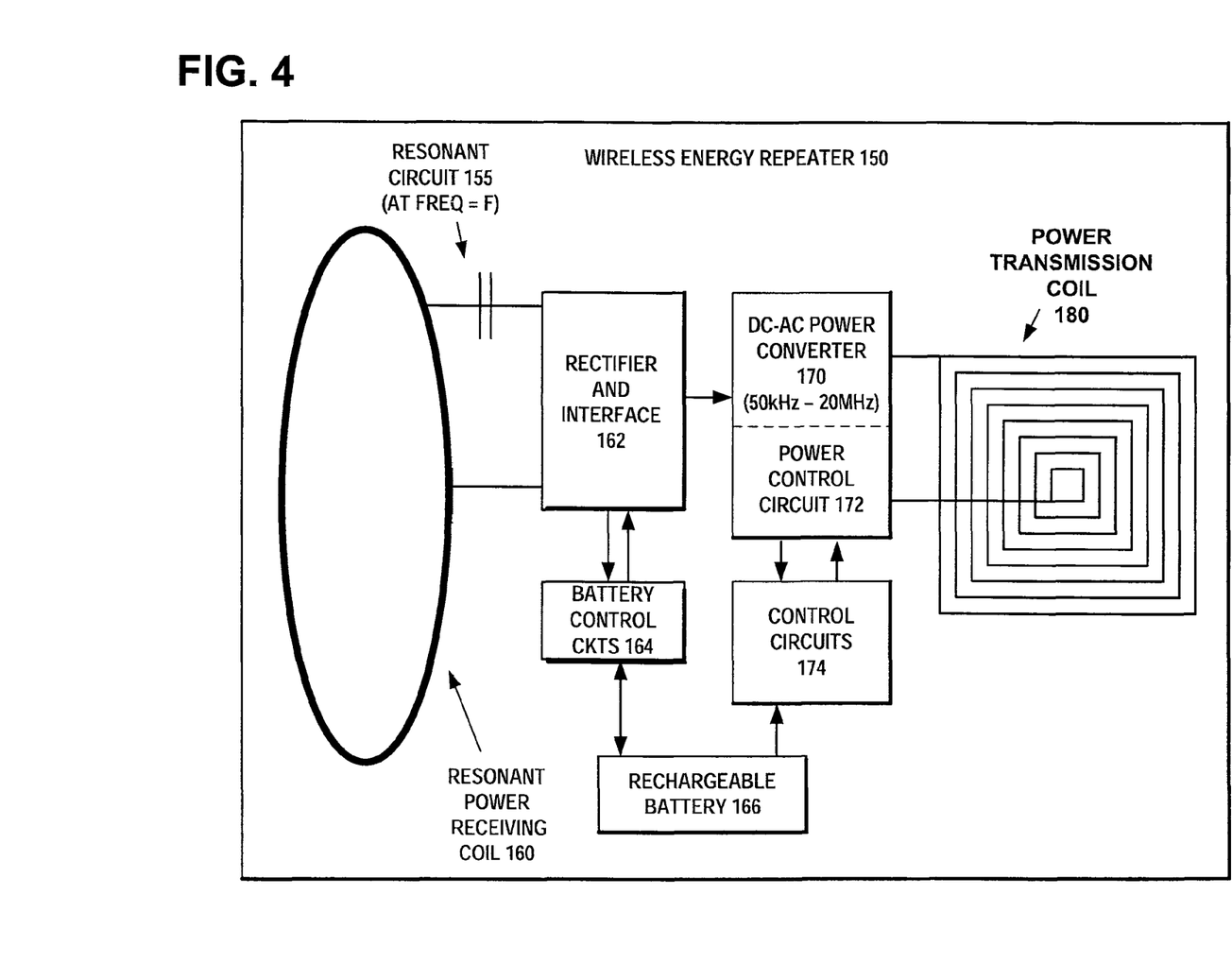
FIG. 4 illustrates an example embodiment of the wireless energy repeater 150, of FIG. 1, showing the resonant power receiving coil 160, the supporting circuitry, and the power transmission coil 180.

FIG. 4 illustrates an example embodiment of the wireless energy repeater 150, of FIG. 1, showing the resonant power receiving coil 160, the supporting circuitry, and the power transmission coil 180. The wireless energy repeater 150 includes a power transmitting coil 180 configured to inductively couple with a proximately located power receiving coil 220 in the user's device 200, to wirelessly provide power to the power receiving coil 220. The wireless energy repeater 150 includes rectifier and interface 162, battery control circuits 164, DC-AC power converter 170, power control circuit 172, and control circuits 174 are coupled between the resonant receiving coil 160 and the power transmitting coil 180, having a control input configured to control power delivered from the resonant receiving coil 160 to the power transmitting coil 180. The wireless energy repeater 150 further includes the resonant receiving coil 160 being resonantly coupled to the resonant transmitting coil 120 when the resonant transmitting coil 120 is driven at the resonant frequency common to both coils, even when a separation distance between the two coils is several times larger than geometric sizes of the coils 120 and 160.

The wireless energy repeater 150 further includes the resonant receiving coil 160 being driven at the resonant frequency and producing a first alternating current at substantially the resonant frequency. The power control circuit 172 may be configured to convert the first alternating current to a second alternating current at a different frequency than the resonant frequency. The power transmitting coil 180 may be configured to inductively couple with the proximately located power receiving coil 220 in the user's device 200 using the second alternating current to provide power to the power receiving coil 220 in the user's device 200 by contact-less electromagnetic induction. The power transmitting coil 180 may be driven at a frequency that ranges between 50 kHz and 20 MHz.

The wireless energy repeater 150 further includes recharging a rechargeable battery 166 from power delivered from the resonant receiving coil 160. The wireless energy repeater 150 includes providing power to the rechargeable battery 166 when power is not being delivered from the resonant receiving coil 160 to the power transmitting coil 180. In alternate embodiments, power may be provided to the rechargeable battery 166 while power is also being delivered from the resonant receiving coil 160 to the power transmitting coil 180.

The wireless energy repeater 150 further includes wirelessly providing power to the power receiving coil 220 when the power transmitting coil 180 is positioned in close proximity to the power receiving coil 220 in the user's device 200 for contact-less electromagnetic induction.

The wireless energy repeater 150 includes wirelessly charging with the power transmitting coil 180 of rechargeable batteries in multiple portable communication devices, high powered hand tools, domestic appliances, or garden tools.

The wireless energy repeater 150 resonant receiving coil 160 is geometrically larger than the power transmitting coil 180.

The wireless energy repeater 150 includes a separation distance between the resonant receiving coil 160 and the resonant transmitting coil 120 being larger than the separation distance between the power transmitting coil 180 and the power receiving coil 220.

Figure 5:
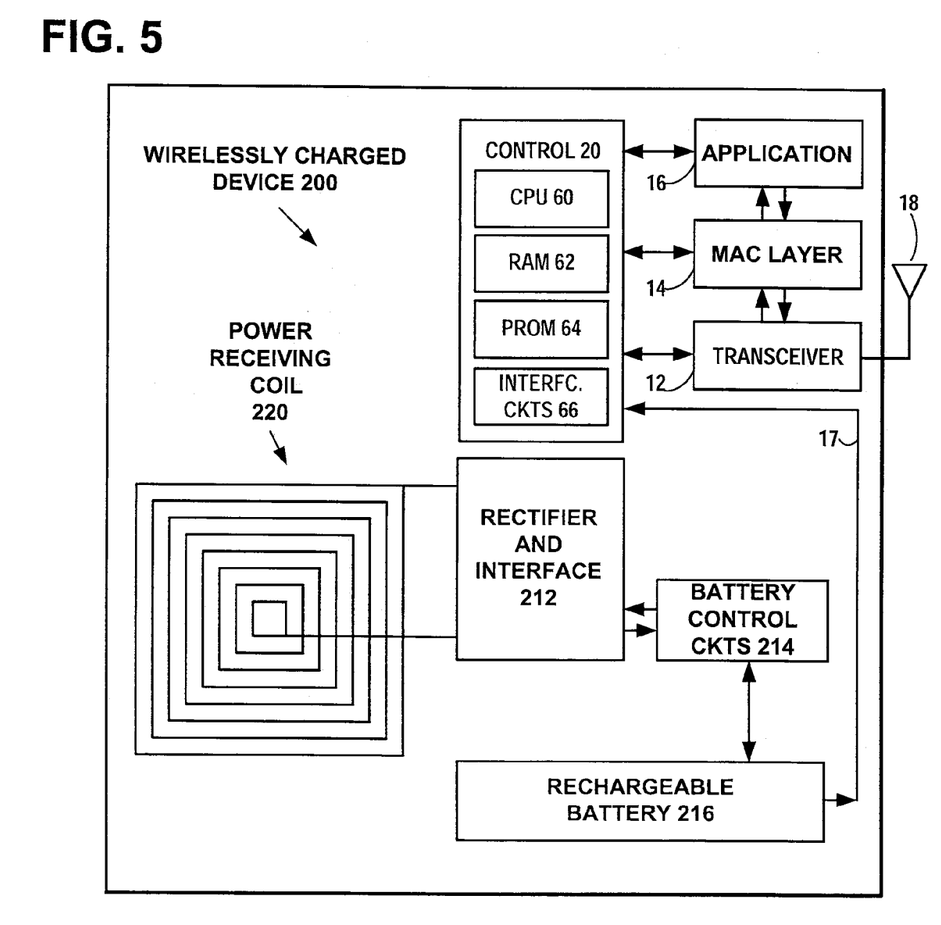
FIG. 5 illustrates an example embodiment for the wirelessly charged user device 200 of FIG. 1, such as a portable communication device.

FIG. 5 illustrates an example embodiment for the wirelessly charged user device 200 of FIG. 1, such as a portable communication device. The induced alternating current drives the rectifier and interface 212 in a range for example between 50 kHz and 20 MHz to produce an appropriate DC charging voltage for the rechargeable battery 216. A battery control circuit 214 adjusts the DC voltage and current. Optionally, charging identification circuits (not shown) may identify the target current and voltage to be applied to each type of rechargeable battery. FIG. 5 shows an example embodiment of the wireless user's device 200, which is shown as a communications device, for example. The wireless device 200 may be for example a mobile communications device, FM-radio, two-way radio, PDA, cell phone, laptop or palmtop computer, or the like. The wireless device 200 includes a control module 20, which includes a central processing unit (CPU) 60, a random access memory (RAM) 62, a read only memory (ROM) 64, and interface circuits 66 to interface with the transceiver 12, battery and other energy sources, key pad, touch screen, display, microphone, speakers, ear pieces, camera or other imaging devices, etc. The RAM 62 and ROM 64 can be removable memory devices such as smart cards, SIMs, WIMs, semiconductor memories such as RAM, ROM, PROMS, flash memory devices, etc. The application and MAC layer may be embodied as program logic stored in the RAM 62 and/or ROM 64 in the form of sequences of programmed instructions which, when executed in the CPU 60, carry out the functions of the disclosed embodiments. The program logic can be delivered to the writeable RAM, PROMS, flash memory devices, etc. 62 of the wireless device 200 from a computer program product or article of manufacture in the form of computer-usable media such as resident memory devices, smart cards or other removable memory devices. Alternately, the MAC layer and application program can be embodied as integrated circuit logic in the form of programmed logic arrays or custom designed application specific integrated circuits (ASIC).

Figure 6:
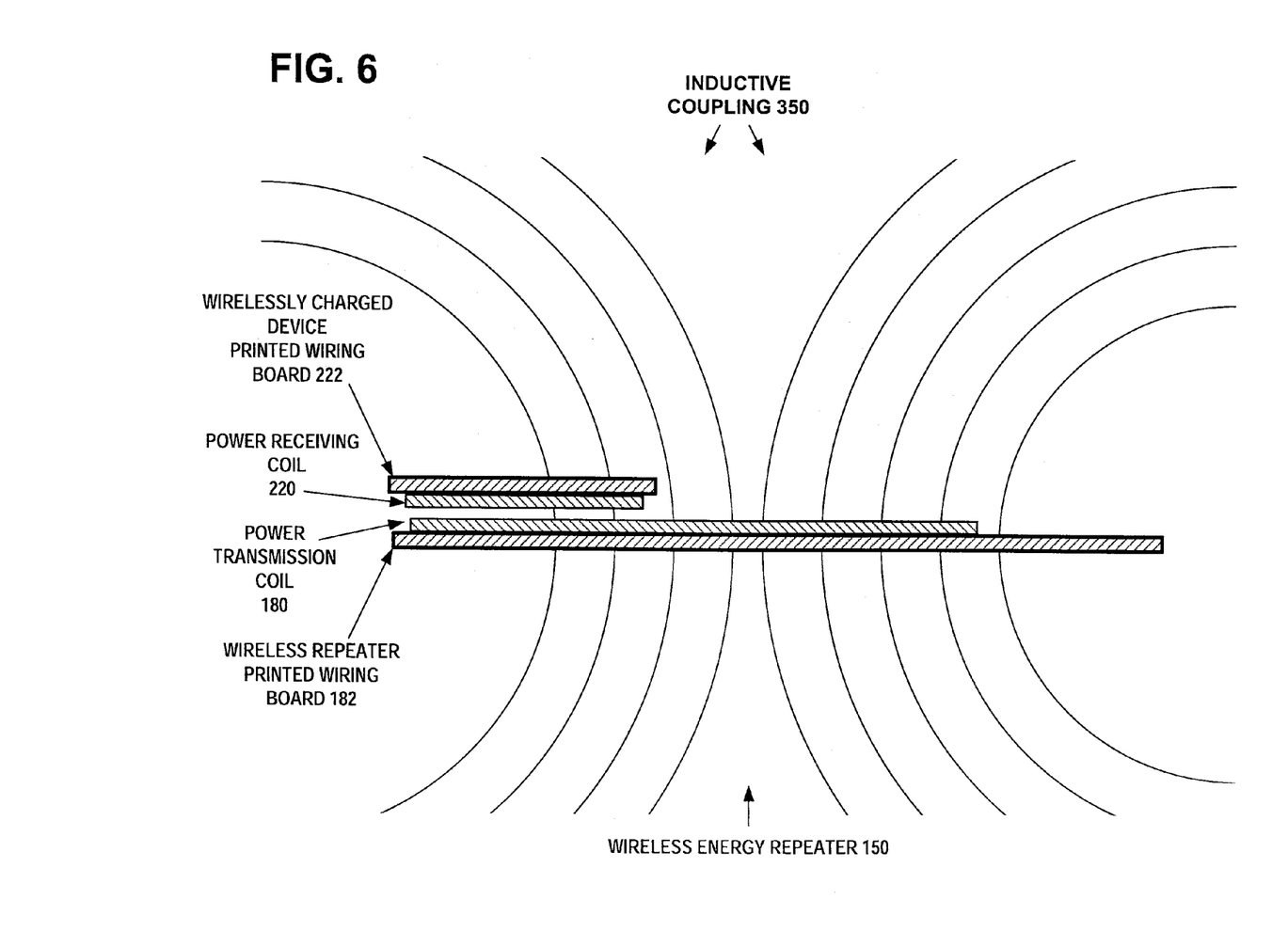
FIG. 6 illustrates an example embodiment for the wireless energy repeater 150 with the power transmission coil 180 being a printed wiring coil on a printed wiring board 182 and the wirelessly charged user device 200 with the power receiving coil 220 being a printed wiring coil on a printed wiring board 222.

FIG. 6 illustrates an example embodiment for the wireless energy repeater 150 with the power transmission coil 180 being a printed wiring coil on a printed wiring board 182 and the wirelessly charged user device 200 with the power receiving coil 220 being a printed wiring coil on a printed wiring board 222. The alternating magnetic field 350 shown in FIG. 6, which is produced by the power transmitting coil 180, magnetically couples with a proximately located receiving coil 220 in the user's charged device 200, using contact-less electromagnetic induction. The two coils 180 and 220 may be planar coils that are positioned proximate to each other in a coplanar mutual orientation, as shown in FIG. 6, where the close proximity of the coplanar coils 180 and 220 improves the inductive coupling between them.

The large sized wireless energy repeater 150 has the capacity to charge rechargeable batteries in multiple portable user devices such as cell phones, high powered hand tools, domestic appliances, or garden tools using contact-less electromagnetic induction. The wireless energy repeater 150 may be generally shaped as a flat plate and typically has an active charging surface approximately the size of a sheet of typing paper. However, the size of the charging surface may be considerably larger or smaller (than a sheet of typing paper) depending on the number and/or size of transmitting coils. The wireless energy repeater 150 may use multiple transmitting coils 180 or a single large transmitting coil 180 to distribute its magnetic flux 350 over the active charging surface. Higher power levels greater than one watt may be required to drive the transmitting coil 180 in the wireless energy repeater 150 in order to provide sufficient power to charge rechargeable batteries in multiple portable user devices such as cell phones or other hand tools or appliances.

FIG. 6 illustrates an example embodiment for the wireless energy repeater 150 with the power transmitting coil 180 being a printed wiring coil on a printed wiring board 182 shown in the side view. In alternate embodiments, a separate printed wiring board 182 may be omitted and the coil 180 may incorporated into the body of the printed wiring board or it may be glued to a plastic substrate. FIG. 6 also illustrates an example embodiment for the wirelessly charged user device 200 with the power receiving coil 220 being a printed wiring coil on a printed wiring board 222 shown in the side view. In alternate embodiments, a separate printed wiring board 222 may be omitted and the coil 220 may incorporated into the body of the printed wiring board or it may be glued to a plastic substrate. Coils 180 and 220 are planar coils printed on their respective circuit boards 182 and 222. Coils 180 and 220 are shown juxtaposed, coplanar, and in close proximity to enable efficient inductive coupling by the magnetic field 350. The two coils 180 and 220 are positioned proximate to each other in a coplanar mutual orientation, so that the close proximity of the coplanar coils 180 and 220 improves the magnetic coupling between them. In embodiments, an additional ferromagnetic foil may be affixed to the backside of the coils 180 and 220 to shield any stray magnetic flux.

Figure 7:
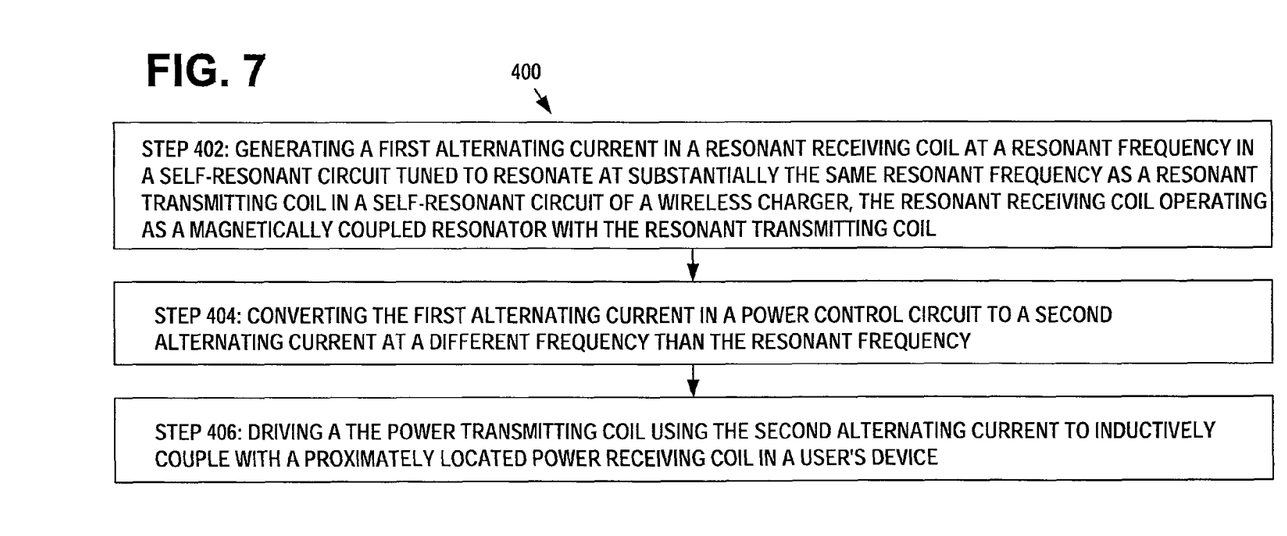
FIG. 7 is a flow diagram 400 of an example method performed by the wireless energy repeater 150.

FIG. 7 is a flow diagram 400 of an example method performed by the wireless energy repeater 150. The example steps are as follows.

Step 402: generating a first alternating current in a resonant receiving coil at a resonant frequency in a self-resonant circuit tuned to resonate at substantially the same resonant frequency as a resonant transmitting coil in a self-resonant circuit of a wireless charger, the resonant receiving coil operating as a magnetically coupled resonator with the resonant transmitting coil;

Step 404: converting the first alternating current in a power control circuit to a second alternating current at a different frequency than the resonant frequency; and Step 406: driving a the power transmitting coil using the second alternating current to inductively couple with a proximately located power receiving coil in a user's device.

Figure 8:
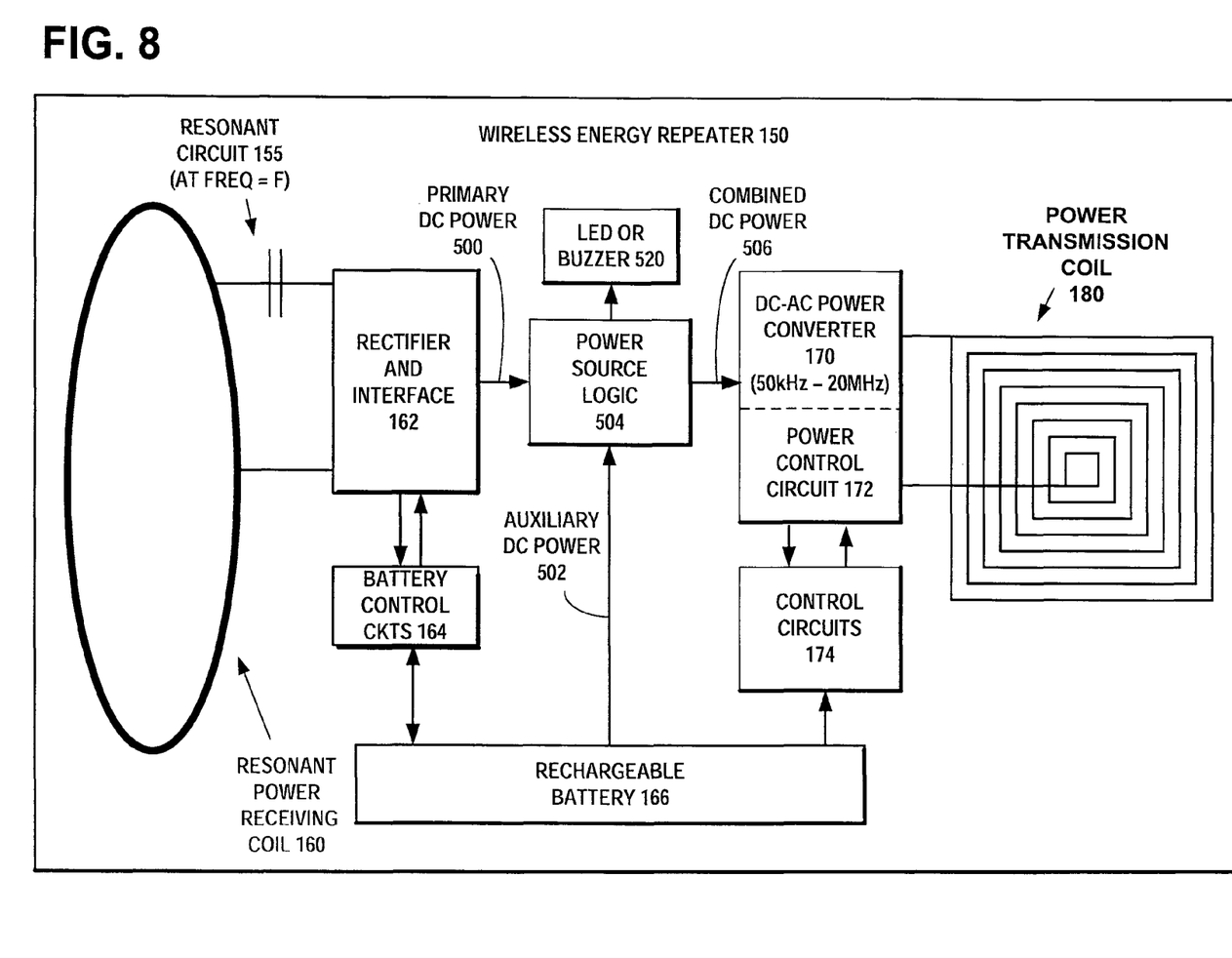
FIG. 8 illustrates an example embodiment of the wireless energy repeater 150, of FIG. 4, showing the power source logic 504 that combines auxiliary DC power 502 from the rechargeable battery 166 with primary DC power from the resonant receiving coil 160 to provide combined DC power to the power transmission coil 180 when insufficient primary DC power 500 is being delivered from the resonant receiving coil 160 to the power transmission coil 180.

FIG. 8 illustrates an example embodiment of the wireless energy repeater 150, of FIG. 4, showing the power source logic 504 that combines auxiliary DC power 502 from the rechargeable battery 166 with primary DC power from the resonant receiving coil 160 to provide combined DC power to the power transmission coil 180 when insufficient primary DC power 500 is being delivered from the resonant receiving coil 160 to the power transmission coil 180.

In example embodiments of the invention, when insufficient power 500 is being delivered from the resonant receiving coil 160 to the power transmission coil 180, and the rechargeable battery 166 in the wireless energy repeater 150 provides auxiliary power 502 to the power transmitting coil, the wireless energy repeater may automatically reduce the output power 506 to the power transmission coil 180, for example by reducing the power 506 step by step and simultaneously indicating to the user that power is being reduced, by means of a light or sound signal from the LED light or buzzer 520. If the wireless energy repeater 150 does not receive sufficient energy from the wireless charger 100, the wireless energy repeater 150 may emit an alarm in the form of a light or sound signal from the LED light or buzzer 520 to the user, to indicate that the wireless energy repeater 150 is out of range of the wireless charger 100 for efficient operation or that the wireless charger 100 is switched off.

Figure 9:
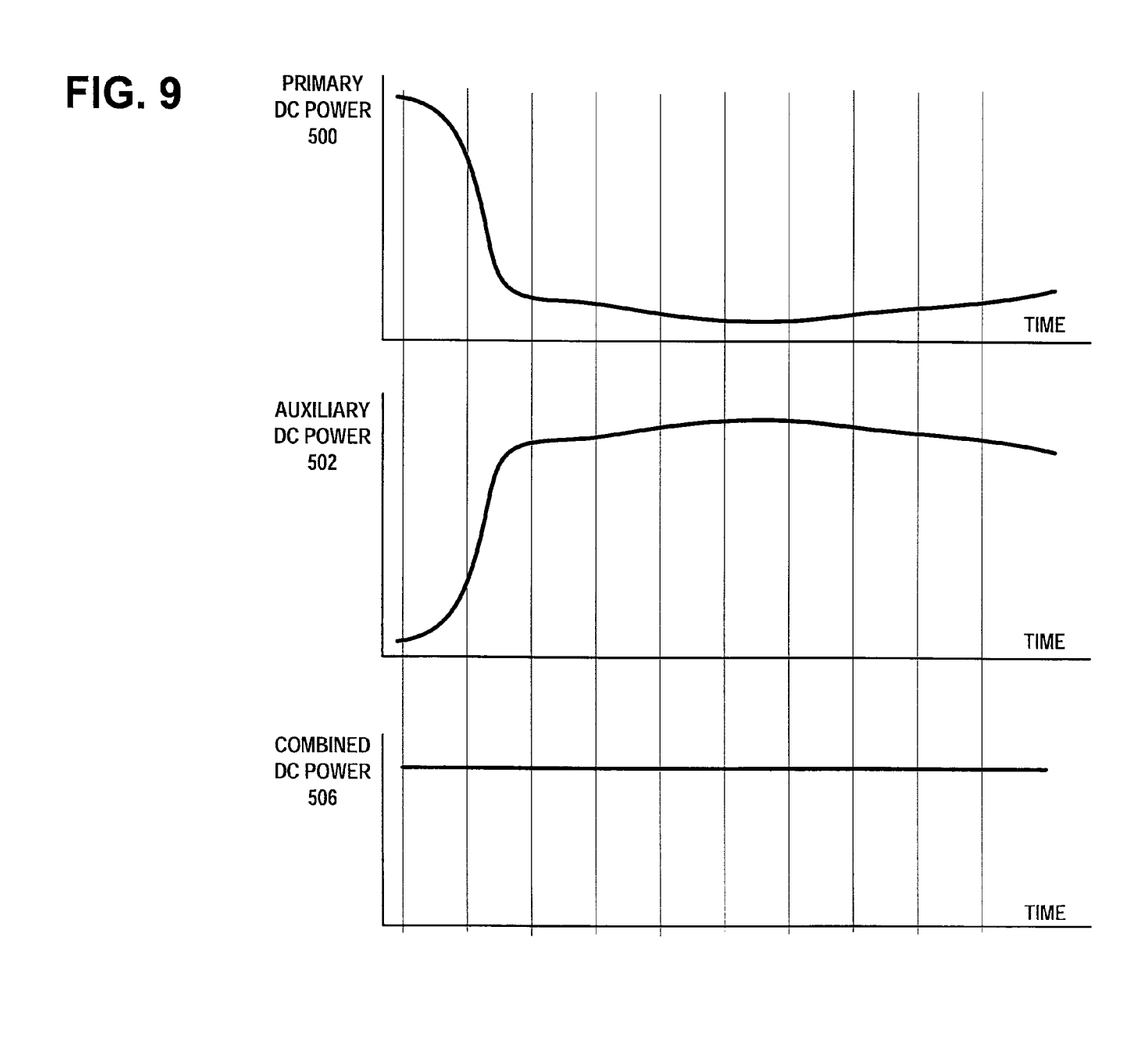
FIG. 9 is an example graph of the operation of the wireless energy repeater 150 of FIG. 8, illustrating the combining of auxiliary DC power 502 in the middle graph, from the rechargeable battery 166, with primary DC power in the top graph, from the resonant receiving coil 160, to provide combined DC power in the bottom graph, to the power transmission coil 180 when insufficient primary DC power 500 is being delivered from the resonant receiving coil 160 to the power transmission coil 180.

FIG. 9 is an example graph of the operation of the wireless energy repeater 150 of FIG. 8, illustrating the combining of auxiliary DC power 502 in the middle graph, from the rechargeable battery 166, with primary DC power in the top graph, from the resonant receiving coil 160, to provide combined DC power in the bottom graph, to the power transmission coil 180 when insufficient primary DC power 500 is being delivered from the resonant receiving coil 160 to the power transmission coil 180.

Figure 10:
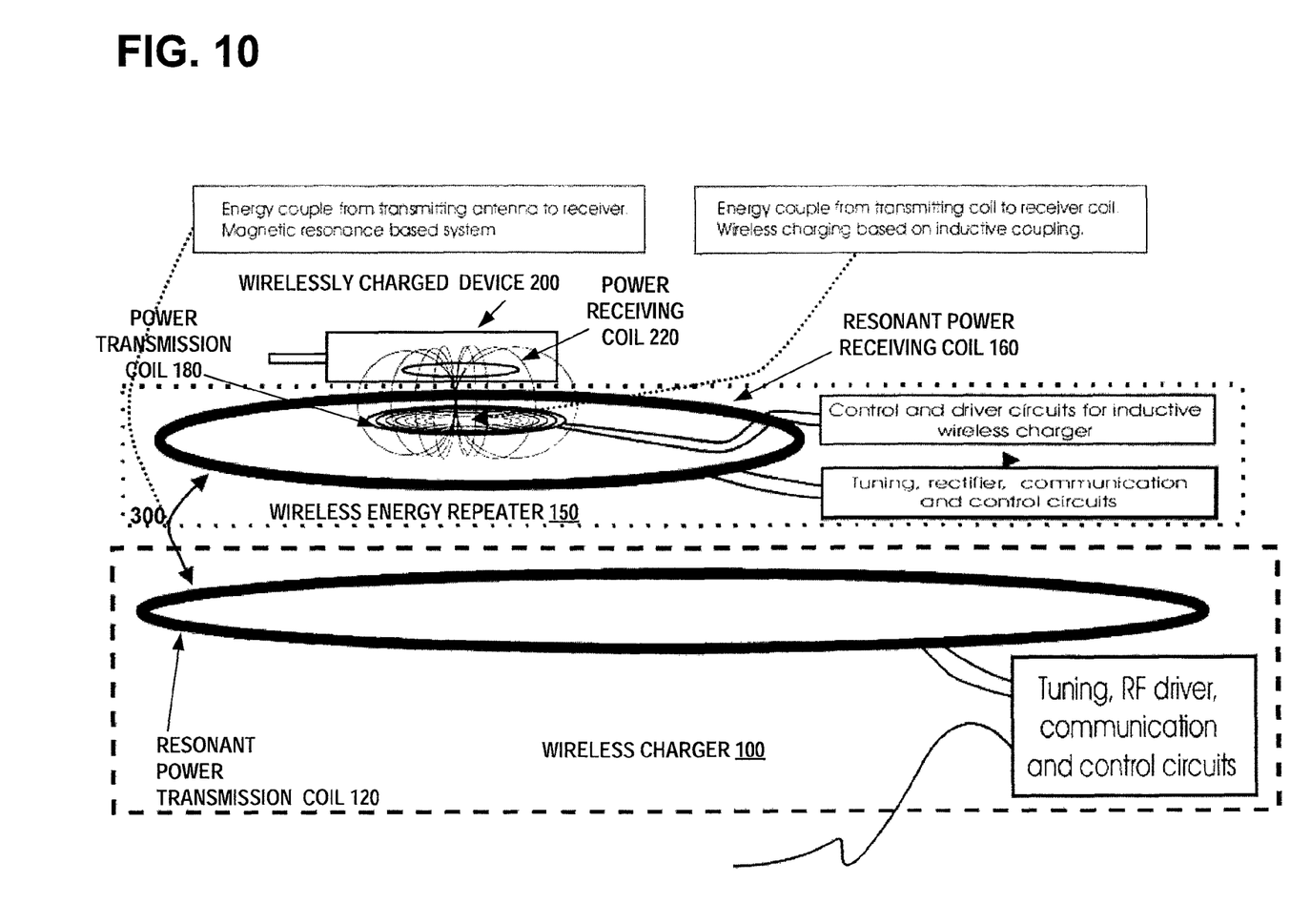
FIG. 10 illustrates an example embodiment for an arrangement of a wireless charger 100, a wireless energy repeater 150, and a wirelessly charged device 200 as shown in FIG. 2, but without the rechargeable battery in the wireless repeater 150. The wireless repeater 150 may be positioned proximate to the planar resonant transmission coil 120 and energy is converted from the resonant power receiving coil 160 to the power transmission coil 180 without the internal rechargeable battery 166.

FIG. 10 illustrates an example embodiment for an arrangement of a wireless charger 100, a wireless energy repeater 150, and a wirelessly charged device 200 as shown in FIG. 2, but without the rechargeable battery 166 in the wireless repeater 150. The wireless repeater 150 may be positioned proximate to the planar resonant transmission coil 120 and energy is converted from the resonant power receiving coil 160 to the power transmission coil 180 without the internal rechargeable battery 166. In example embodiments, the wireless repeater 150 may be positioned directly on top of the planar resonant transmission coil 120

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. An apparatus, comprising:
a resonant receiving coil of a wireless energy repeater in a self-resonant circuit tuned to resonate at substantially a same resonant frequency as a resonant transmitting coil in a self-resonant circuit of a wireless charger, the resonant receiving coil operating as a magnetically coupled resonator with the resonant transmitting coil;
a power transmitting coil of the wireless energy repeater configured to inductively couple with a proximately located power receiving coil in a user's device, to wirelessly provide power to the power receiving coil; and
a power control circuit coupled between the resonant receiving coil and the power transmitting coil, having a control input configured to control power delivered from the resonant receiving coil to the power transmitting coil.

2. The apparatus of claim 1, which further comprises:
the resonant receiving coil being resonantly coupled to the resonant transmitting coil when the resonant transmitting coil is driven at the resonant frequency common to both coils, even when a separation distance between the two coils is several times larger than geometric sizes of the coils.

3. The apparatus of claim 1, which further comprises:
the resonant receiving coil being driven at the resonant frequency and producing a first alternating current at substantially the resonant frequency;
the power control circuit configured to convert the first alternating current to a second alternating current at a different frequency than the resonant frequency; and
the power transmitting coil configured to inductively couple with the proximately located power receiving coil in the user's device using the second alternating current.

4. The apparatus of claim 1, wherein the power transmitting coil is driven at a frequency that ranges between 50 kHz and 20 MHz.

5. The apparatus of claim 1, wherein the resonant frequency ranges between 1 MHz and 30 MHz.

6. An apparatus, comprising:
a resonant receiving coil in a self-resonant circuit tuned to resonate at substantially a same resonant frequency as a resonant transmitting coil in a self-resonant circuit of a wireless charger, the resonant receiving coil operating as a magnetically coupled resonator with the resonant transmitting coil;
a power transmitting coil configured to inductively couple with a proximately located power receiving coil in a user's device, to wirelessly provide power to the power receiving coil;
a power control circuit coupled between the resonant receiving coil and the power transmitting coil, having a control input configured to control power delivered from the resonant receiving coil to the power transmitting coil; and
a rechargeable battery in the apparatus coupled to the resonant receiving coil, configured to be recharged from power delivered from the resonant receiving coil;
the power control circuit configured to provide power to the rechargeable battery when power is not being delivered from the resonant receiving coil to the power transmitting coil.

7. The apparatus of claim 1, which further comprises:
the power transmitting coil being configured to be positioned in close proximity to the power receiving coil in the user's device for contact-less electromagnetic induction, to wirelessly provide power to the power receiving coil.

8. The apparatus of claim 1, which further comprises:
the power transmitting coil being configured to wirelessly charge rechargeable batteries in multiple portable communication devices, high powered hand tools, domestic appliances, or garden tools.

9. The apparatus of claim 1, which further comprises:
the resonant receiving coil being geometrically larger than the power transmitting coil.

10. The apparatus of claim 1, which further comprises:
a separation distance between the resonant receiving coil and the resonant transmitting coil is larger than a separation distance between the power transmitting coil and the power receiving coil.

11. A method, comprising:
generating a first alternating current in a resonant receiving coil of a wireless energy repeater at a resonant frequency in a self-resonant circuit tuned to resonate at substantially the same resonant frequency as a resonant transmitting coil in a self-resonant circuit of a wireless charger, the resonant receiving coil operating as a magnetically coupled resonator with the resonant transmitting coil;
converting the first alternating current in a power control circuit to a second alternating current at a different frequency than the resonant frequency; and
driving a the power transmitting coil of the wireless energy repeater using the second alternating current to inductively couple with a proximately located power receiving coil in a user's device.

12. The method of claim 11, which further comprises:
resonantly coupling the resonant receiving coil to the resonant transmitting coil when the resonant transmitting coil is driven at the resonant frequency common to both coils, even when a separation distance between the two coils is several times larger than geometric sizes of the coils.

13. The method of claim 11, which further comprises:
driving the resonant receiving coil at the resonant frequency and producing a first alternating current at substantially the resonant frequency;
converting the first alternating current to a second alternating current at a different frequency than the resonant frequency; and
inductively coupling the power transmitting coil with the proximately located power receiving coil in the user's device using the second alternating current.

14. The method of claim 11, wherein the power transmitting coil is driven at a frequency that ranges between 50 kHz and 20 MHz.

15. The method of claim 11, wherein the resonant frequency ranges between 1 MHz and 30 MHz.

16. A method, comprising:
generating a first alternating current in a resonant receiving coil at a resonant frequency in a self-resonant circuit tuned to resonate at substantially the same resonant frequency as a resonant transmitting coil in a self-resonant circuit of a wireless charger, the resonant receiving coil operating as a magnetically coupled resonator with the resonant transmitting coil;
converting the first alternating current in a power control circuit to a second alternating current at a different frequency than the resonant frequency;
driving a the power transmitting coil using the second alternating current to inductively couple with a proximately located power receiving coil in a user's device;
recharging a rechargeable battery in the apparatus from power delivered from the resonant receiving coil; and
providing power to the rechargeable battery when power is not being delivered from the resonant receiving coil to the power transmitting coil.

17. The method of claim 11, which further comprises:
wirelessly provide power to the power receiving coil when the power transmitting coil is positioned in close proximity to the power receiving coil in the user's device for contact-less electromagnetic induction.

18. The method of claim 11, which further comprises:
wirelessly charging with the power transmitting coil of rechargeable batteries in multiple portable communication devices, high powered hand tools, domestic appliances, or garden tools.

19. The method of claim 11, which further comprises:
the resonant receiving coil being geometrically larger than the power transmitting coil.

20. The method of claim 11, which further comprises:
a separation distance between the resonant receiving coil and the resonant transmitting coil being larger than a separation distance between the power transmitting coil and the power receiving coil.

21. The method of claim 11, which further comprises:
recharging a rechargeable battery in the apparatus from power delivered from the resonant receiving coil;
providing power to the rechargeable battery while power is also being delivered from the resonant receiving coil to the power transmitting coil.

22. The apparatus of claim 1, which further comprises:
a rechargeable battery in the apparatus coupled to the resonant receiving coil, configured to be recharged from power delivered from the resonant receiving coil;
the power control circuit configured to provide power to the rechargeable battery while power is also being delivered from the resonant receiving coil to the power transmitting coil.

23. A method, comprising:
generating a first alternating current in a resonant receiving coil at a resonant frequency in a self-resonant circuit tuned to resonate at substantially the same resonant frequency as a resonant transmitting coil in a self-resonant circuit of a wireless charger, the resonant receiving coil operating as a magnetically coupled resonator with the resonant transmitting coil;
converting the first alternating current in a power control circuit to a second alternating current at a different frequency than the resonant frequency;
driving a the power transmitting coil using the second alternating current to inductively couple with a proximately located power receiving coil in a user's device;
recharging a rechargeable battery in the apparatus from power delivered from the resonant receiving coil; and
providing auxiliary power from the rechargeable battery to the power transmitting coil when insufficient power is being delivered from the resonant receiving coil to the power transmitting coil.

24. An apparatus, comprising:
a resonant receiving coil in a self-resonant circuit tuned to resonate at substantially a same resonant frequency as a resonant transmitting coil in a self-resonant circuit of a wireless charger, the resonant receiving coil operating as a magnetically coupled resonator with the resonant transmitting coil;
a power transmitting coil configured to inductively couple with a proximately located power receiving coil in a user's device, to wirelessly provide power to the power receiving coil;
a power control circuit coupled between the resonant receiving coil and the power transmitting coil, having a control input configured to control power delivered from the resonant receiving coil to the power transmitting coil; and
a rechargeable battery in the apparatus coupled to the resonant receiving coil, configured to be recharged from power delivered from the resonant receiving coil;
the power control circuit configured to provide power from the rechargeable battery to the power transmitting coil when insufficient power is being delivered from the resonant receiving coil to the power transmitting coil.

25. An apparatus, comprising:
a resonant receiving coil in a self-resonant circuit tuned to resonate at substantially a same resonant frequency as a resonant transmitting coil in a self-resonant circuit of a wireless charger, the resonant receiving coil operating as a magnetically coupled resonator with the resonant transmitting coil;
a power transmitting coil configured to inductively couple with a proximately located power receiving coil in a user's device, to wirelessly provide power to the power receiving coil;
a power control circuit coupled between the resonant receiving coil and the power transmitting coil, having a control input configured to control power delivered from the resonant receiving coil to the power transmitting coil; and
a rechargeable battery in the apparatus coupled to the resonant receiving coil, configured to be recharged from power delivered from the resonant receiving coil;
wherein, when insufficient power is being delivered from the resonant receiving coil to the power transmitting coil and the rechargeable battery provides auxiliary power to the power transmitting coil, the apparatus automatically reduces output power to the power transmission coil.

26. The apparatus of claim 25, which further comprises:
a light or buzzer in the wireless energy repeater configured to indicate when insufficient power is being delivered from the resonant receiving coil to the power transmitting coil.

27. The apparatus of claim 25, which further comprises:
a light or buzzer in the wireless energy repeater configured to indicate that the wireless energy repeater is out of range of the wireless charger for efficient operation or that the wireless charger is switched off.

* * * * *

UNITED STATES PATENT AND TRADEMARK OFFICE
CERTIFICATE OF CORRECTION

| | | |
|---|---|---|
| PATENT NO. | : 8,427,101 B2 | Page 1 of 1 |
| APPLICATION NO. | : 12/620861 | |
| DATED | : April 23, 2013 | |
| INVENTOR(S) | : Esa Ilmari Saunamäki | |

It is certified that error appears in the above-identified patent and that said Letters Patent is hereby corrected as shown below:

In the Claims:

In Column 13,

Line 26, "driving a the power transmitting coil" should read, --driving a power transmitting coil--.

Signed and Sealed this
Eighteenth Day of February, 2014

Michelle K. Lee
*Deputy Director of the United States Patent and Trademark Office*